No. 880,003. PATENTED FEB. 25, 1908.
O. R. BEUSSE & M. P. JACKSON.
MACHINE FOR THINNING COTTON PLANTS.
APPLICATION FILED JUNE 27, 1907.
2 SHEETS—SHEET 1.
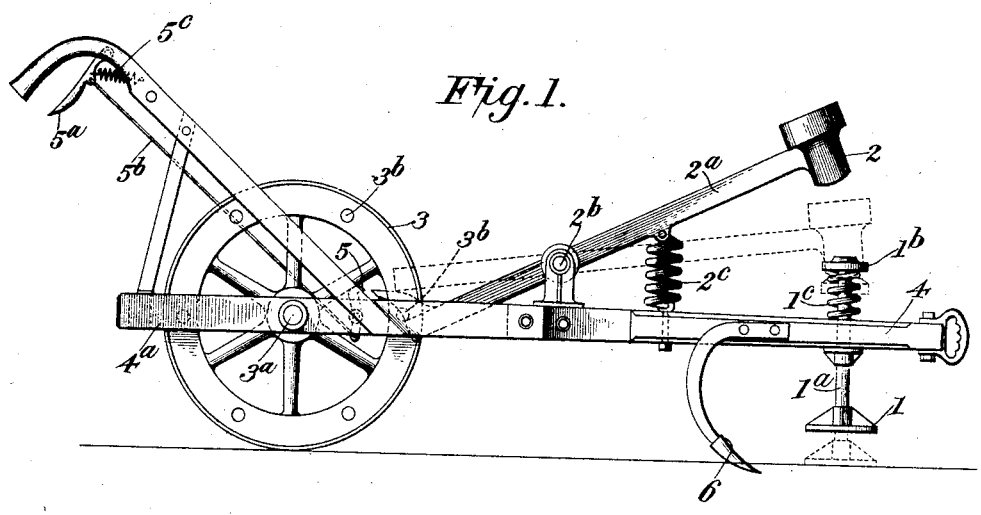
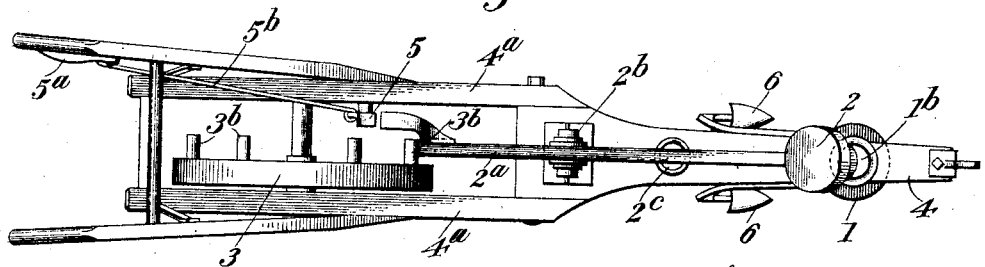
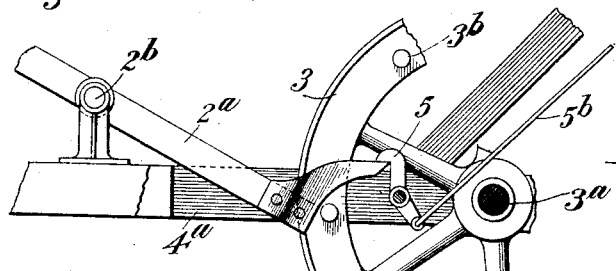
Inventors:
Mark P. Jackson
Oscar R. Beusse No. 880,003. PATENTED FEB. 25, 1908.
O. R. BEUSSE & M. P. JACKSON.
MACHINE FOR THINNING COTTON PLANTS.
APPLICATION FILED JUNE 27, 1907.
2 SHEETS—SHEET 2.
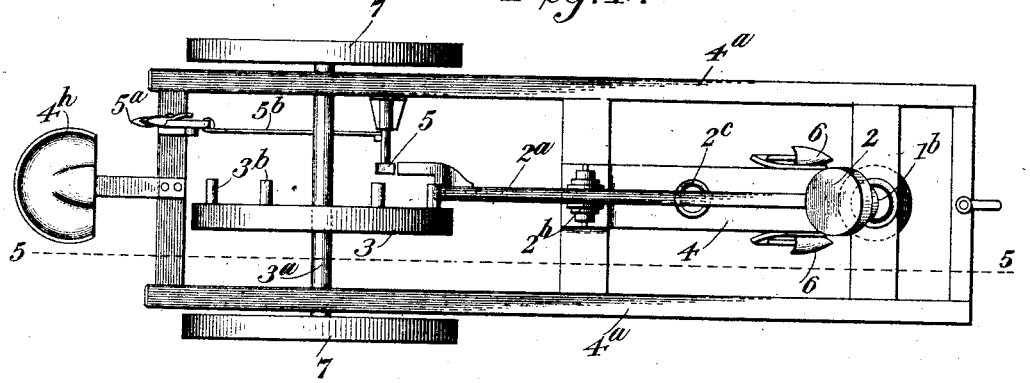
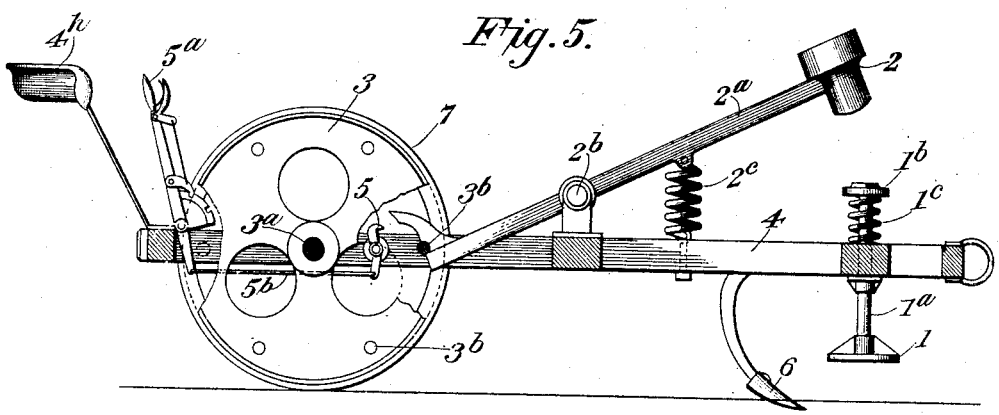
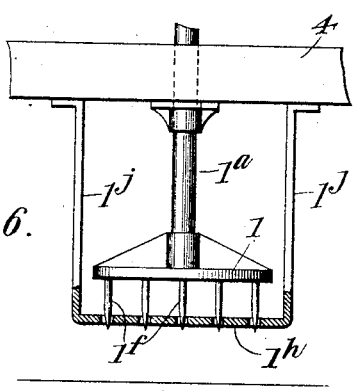
Inventors
Mark P. Jackson
Oscar R. Beusse
Witnesses
By Alexander Dowell
Attorneys

UNITED STATES PATENT OFFICE.

OSCAR R. BEUSSE AND MARK PIERRE JACKSON, OF MONTEZUMA, GEORGIA.

MACHINE FOR THINNING COTTON-PLANTS.

No. 880,003.  Specification of Letters Patent.  Patented Feb. 25, 1908.

Application filed June 27, 1907. Serial No. 381,156.

*To all whom it may concern:*

Be it known that we, OSCAR R. BEUSSE and MARK P. JACKSON, both of Montezuma, Macon county, State of Georgia, have invented certain new and useful Improvements in Machines for Thinning Cotton-Plants; and we do hereby declare that the following is a full, clear, and exact description thereof, reference being had to the accompanying drawings, which form part of this specification.

This invention is an improvement in machines for thinning young cotton plants, and is designed to take the place of what is ordinarily termed cotton choppers; the special object of the invention is to provide an effective and suitable means whereby the entire plant can at intervals be stamped, thus insuring their destruction while preserving the symmetry of the rows, and without injury to the remaining or selected plants.

The invention in brief comprises a stamp mounted on a frame and shaped to be drawn along the rows, and the frame is provided with means for actuating the stamp at desired intervals so that at each operation the stamp has to crush a certain number of plants in the rows, and the frequency of these operations to determine the number of plants left standing in the row.

We will now explain the invention in connection with the accompanying drawings which illustrate a view of the invention embodying the invention and which will enable those skilled in the art to use the same.

In the drawings—Figure 1 is a side view of the complete machine. Fig. 2 is a plan view. Fig. 3 is a detail section showing the latch holding the hammer raised. Fig. 4 is a plan view of a riding machine. Fig. 5 is a section on line 5—5, of Fig. 4. Fig. 6 is a detail view of modified form of stamper.

In the form shown in Figs. 1 and 2, the apparatus comprises a stamp 1 connected to a vertically movable shaft $1^a$ which is guided in a vertical opening in a beam 4 of the main frame which approximately resembles a cultivator frame. The stamp is normally upheld by means of an expansion spring $1^c$ interposed between the beam 4 and the head $1^b$ of the shaft $1^a$. The stamp is adapted to be struck by a hammer 2 which may be weighted as desired and which is mounted on the end of lever $2^a$, pivoted at $2^b$ on the beam 4 and which may be provided with a contractile spring $2^c$ connected to the lever $2^a$ in advance of the pivot $2^b$ and to the beam 4 so that when the hammer is raised the spring $2^c$ is put under tension. The hammer is raised by means of a bull-wheel 3 which is mounted on a shaft $3^a$ journaled in side members $4^a$ of the main frame which are attached at the forward ends to beam 4, see Fig. 2, and the wheel is provided with pins $3^b$, which may be bolted thereto at regular intervals apart and which are adapted to successively contact with the rear end of lever $2^a$ and to press the latter as indicated in Fig. 1 as the machine moves forward and thus each pin $3^b$ will engage and lift the hammer as soon as the pin disengages the beam the hammer drops by gravity and the action of spring $2^c$ and strikes the head $1^b$ and drives the stamp downward sufficiently to crush the young plants thereunder, the spring $1^c$ being too weak to resist the blow of the hammer but yet sufficiently strong to lift the stamp after the blow has been struck. Obviously by varying the distance at which the pins are set relatively to each other the number of blows struck by the hammer for each rotation of the wheel can be regulated and determined.

If at any time it should be desired to throw the hammer out of operation the operator can throw catch 5 into operation by pulling the catch-lever $5^a$ which is connected to catch 5 by a rod $5^b$, catch 5 being pivoted on the frame adjacent the rear end of lever $2^a$ and in such a position that when the lever is fully depressed catch 5 can be caused to engage the stop-lug attached to the rear end of the lever and hold the hammer lifted. When the operator releases the lever $5^a$ the spring $5^c$ or the latch and segment shown in Figs. 5 and 6, can hold the catch out of operative position.

The device may be provided with cultivators 6 which are attached to the beam 4 in the rear of the stamp 1 and may be of any desired construction.

For working in some kind of material it may be desired to provide the stamp with guides or studs on its under side, as shown at $1^f$ in Fig. 6, and when these are used we prefer to provide devices for cleaning the fingers of rubbish or dirt adhering thereto, for example, as shown in Fig. 6, a perforated plate or guard $1^h$ could be arranged below the stamp and secured to the beam 4 by hangers $1^j$.

If it is desired to make a riding machine, the shaft of the bull-wheel 3 could be extended to carry the wheels 7, (see Fig. 4), and the frame correspondingly widened and provided with a seat 4^h.

The construction and operation of the parts however, are substantially as described.

Having described our invention what we claim as new and desire to secure by Letters Patent is:

1. In a cotton row thinning machine, the combination of a frame, a yielding stamp mounted thereon, and an automatically and intermittently operated hammer adapted to deliver blows upon the head of said stamp, substantially as and for the purpose described.

2. In a cotton thinning machine, the combination of a frame, a spring controlled stamp mounted thereon; with means for actuating the stamp by impact at predetermined intervals, substantially as described.

3. The combination in a cotton plant thinning machine, of a suitable frame having a bull-wheel mounted thereon; with a pivoted hammer adapted to be automatically operated by said wheel, and a yielding stamp adapted to receive blows from the hammer, all substantially as and for the purpose described.

4. In a cotton thinning machine, the combination of a frame, a yieldable stamp mounted thereon, a pivoted spring actuated hammer mounted on said frame and adapted to actuate the stamp at predetermined intervals, and means for throwing the hammer into or out of operation.

5. In a cotton thinning machine, a frame, a stamp mounted thereon, a pivoted spring actuated hammer, in combination with a wheel provided with pins secured at intervals on the face thereof for engagement of the hammer lever, whereby when the hammer is raised the spring is put under tension, and when released from engagement with the pins the stamp receives the impact of the hammer.

6. In a cotton thinner, the combination of the main frame, a vertically movable stamp mounted on said frame, a hammer adapted to contact said stamp, and means for raising the hammer from normal to striking position, a spring for limiting the movement of said hammer, and a spring for returning the hammer to normal position, a wheel at the rear of said frame, and provided with means for engaging the end of the hammer lever for lifting the hammer.

7. In a cotton thinner, the combination of the frame, a stamp on the outer end of said frame and vertically movable therein, an expansion spring for normally upholding said stamp, a pivoted lever on said frame provided with a weighted hammer, a contractile spring connected to said frame and lever whereby when the hammer is raised the spring is put under tension, a wheel in rear of said frame provided with pins at intervals adapted to successively contact with the rear end of said lever and raise the hammer as the machine is moved forward, and means for throwing the hammer out of operation.

8. In a cotton thinner, the combination of the main frame, a vertically movable stamp mounted on said frame, guides on the under side of said stamp and a guard for cleaning the fingers of said stamp guides; a hammer adapted to contact said stamp, and means for raising the hammer from normal to striking position; a spring for limiting the movement of said hammer, and a spring for returning the hammer to normal position; a wheel mounted on the rear of said frame and provided with means for engaging the end of the hammer lever for gradually lifting the hammer; a catch and catch-lever adjacent the rear end of the main frame for throwing the hammer into or out of operation.

In testimony that we claim the foregoing as our own, we affix our signatures in presence of two witnesses.

OSCAR R. BEUSSE.
MARK PIERRE JACKSON.

In presence of—
T. W. OLIVER, Jr.,
JACK C. REDDICK.